May 22, 1973
H. H. LUDEMAN
3,734,750
CHEESE PACKAGE AND PACKAGING PROCESS
Filed June 18, 1969
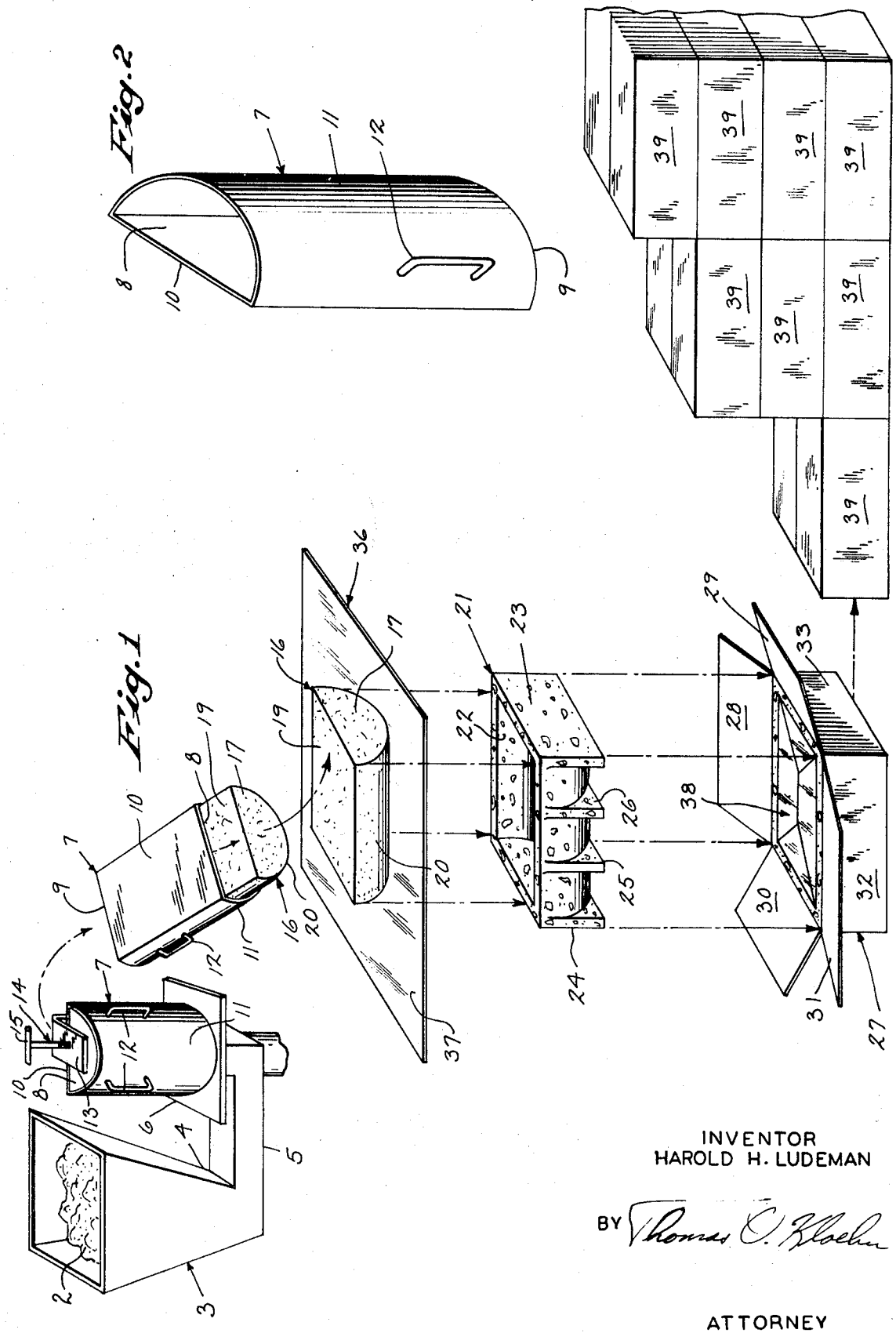
INVENTOR
HAROLD H. LUDEMAN
BY Thomas O. Kloehn
ATTORNEY

United States Patent Office 3,734,750
Patented May 22, 1973

3,734,750
CHEESE PACKAGE AND PACKAGING PROCESS
Harold H. Ludeman, 23 W. Jefferson St.,
Black River Falls, Wis.
Filed June 18, 1969, Ser. No. 834,375
Int. Cl. A23c 19/16
U.S. Cl. 99—178                              5 Claims

ABSTRACT OF THE DISCLOSURE

Packaging for semi-soft cheese is disclosed whereby the cheese is formed into a semi-cylindrical shape. The package includes a carton with a polystyrene foam cradle seated snugly in it and having an interior shape forming to the shape of the cheese with a sheet of wrapping material lining the cradle and folded about the cheese. When the carton is closed, the completed packages are stacked.

BACKGROUND OF THE INVENTION

Semi-soft cheese is defined by Federal and State standards as having from 45 to 50 percent milk fat in the solids and no more than 50 percent moisture. Typical of such a cheese is mozzarella cheese, which is used in making pizza. By contrast hard cheeses include cheddar cheese, parmesan cheese and the like, which contain less than 40 percent moisture, and soft cheeses include limburger, camembert, and the like which can contain up to 85 percent moisture. Traditionally, when mozzarella cheese was kneaded by hand and sold for direct consumption, it was formed into a spherical shape, waxed and wrapped in a net because it was not hard enough to hold a shape, but will deform under its own weight. For commercial usages, more recently, mozzarella and other semi-soft cheeses have been shaped as rectangular solids, vacuum wrapped in a heat-sealed plastic film bag, and a tightly packed rectangular carton to be mutually supporting to hold the rectangular shapes.

Often it is desirable to be able to manufacture and deliver semi-soft cheeses in shapes specifically adapted to a particular end use. For example, mozzarella cheese is extensively used in making pizzas to be distributed and sold as a prepared frozen food product. Since pizzas are round, it has been customary in the past to put the cheese on the pizza either by grating and spreading it or by manually distributing square slices in overlapping relationship. Both of those methods result in the use of too much cheese which can total thousands of pounds of excess cheese per day in a large factory, and both require expensive manufacturing steps. Therefore, it is desirable to be able to provide the cheese in a semi-circular form such as is shown in the drawings so that it can be sliced and automatically dropped in place in precisely accurate amounts with a minimum of labor and manufacturing effort. Different uses and different kinds of semi-soft cheese may generate demand for different shapes, but since the cheese will not hold its shape, it has been impossible to provide such shapes in commercial amounts.

Also, previous methods devised for packaging so as to extend the shelf life of cheese have involved vacuum packing and heat sealing pieces of cheese in plastic bags. In small factories this is done manually, increasing labor costs. Also, plastic bags are excessively expensive as compared with the low price and narrow margin of each piece of cheese packaged. It is highly desirable that such packaging costs be reduced as far as possible so that the public can be provided with the most food for its money.

SUMMARY OF THE INVENTION

The present invention relates to a process and apparatus for packaging cheese, and more particularly the invention resides in a package having an external carton with a rigid cradle adapted to fit securely inside said carton and having an interior shape conforming to a desired shape of a piece of cheese and being adapted to receive and support said cheese, and a sheet of flexible wrapping material lining said cradle and being of sufficient size to enclose said cheese. The invention also resides in a process whereby doughy cheese is pressed into forms to impose a desired shape on said cheese, said cheese is removed from said form, said cheese is placed in a relatively rigid supporting cradle having an interior shape conforming to said desired shape and said cheese in said cradle is enclosed in a carton.

By the foregoing process and apparatus cheese may be manufactured, stored, and distributed in any desired shape. Since the carton and the cradle are reusable items, the cost of these packaging components may be distributed over multiple uses to become negligible as prorated to each package. The only other expense is the wrapper, which, being a sheet and being open wrapped rather than sealed adds but a minute fraction of the cost incurred with the prior art method employing vacuum packed bags. Since the cheese may undergo plastic deformation due to its own weight, it will form a tight seal with the wrapper material against the cradle so as to deprive all of the supported surfaces of the cheese of oxygen necessary to mold growth. Hence, shelf life is maximized. Cheese can be manufactured and sold in any shape desired for its end use. The cheese is shielded against physical damage that many otherwise occur during shipping or handling. All of these features combine to achieve the ultimate goal of providing a consuming public with the greatest amount of food at the lowest cost, by reducing packaging costs, processing costs and losses due to spoilage and damage in shipment and handling.

BRIEF DESCRIPTION OF THE DRAWINGS

In the drawing:

FIG. 1 is a flow diagram of the packaging process and apparatus according to the present invention, and FIG. 2 is an isometric view of a form employed to impart the desired shape to the semi-soft cheese according to the present invention.

DESCRIPTION OF THE PREFERRED EMBODIMENT

After the curd of semi-soft cheese such as mozzarella is formed, separated and washed, it is subjected to several stages of heating and kneading which is performed by a machine designed for that purpose. The heated, kneaded product is an amorphous quantity of highly plastic cheese 2, which has doughy texture and consistency. This doughy cheese 2 is placed in a hopper 3 that opens at its bottom end 4 into a conduit 5. The conduit 5 extends laterally from the bottom end 4 of the hopper 3 and opens through an aperture (not shown) in a table 6. The conduit 5 contains an auger conveyor (not shown) to drive the plastic, doughy cheese 2 from the hopper 3 through the conduit 5 and up through the aperture (not shown) in the table 6.

A hollow, stainless steel form 7 stands on top of the table 6 with its open end 8 over the aperture (not shown) through the table 6 that communicates with the conduit 5. The form 7 is a rigid, stainless steel vessel that is entirely enclosed except at its open end 8, and it has a semi-cylindrical shape with a semi-circular flat end 9 opposite its open end 8, a flat rectangular lateral wall 10 defining one side and an accurate lateral wall 11 defining its other side. A pair of handles 12 are welded to the arcuate lateral wall 11. The dimensions of the form 7 are such that the inside of the flat wall 10 is eleven inches by seventeen inches and the largest radial dimension of the inside of the end wall 9 is 5⅝.

The form 7 is clamped in place by means of a bracket 13 which adjustably supports a clamping member 14 which has a T-shaped rotatable adjusting member 15 so that it can be screw adjusted to clamp the form 7 tightly to the table 6. Thus the doughy cheese 2 can be driven under pressure into the form 7 by the auger (not shown) in the conduit 5 until the doughy cheese 2 entirely fills the form 7 and is tightly compressed into the form 7. Although the drawing does not show the details of the table 6, those skilled in the art will understand that it is reciprocable to cut off feed of the doughy cheese 2 when the form 7 is full.

The filled form 7 is then placed in a vat of water and cooled, after which a semi-cylindrical shaped block of semi-soft cheese 16 can be slid out of the form 7. Like the form 7, the shaped cheese 16 has semi-circular flat ends 17 and 18, a flat rectangular side 19 and a curved side 20. The shaped cheese 16 is sufficiently firm to hold its shape for a short period of time while it is being packaged, but even when cooled it will manifest plastic flow under the gravitational force of its own weight. Hence, unless supported the semi-soft cheese 16 will lose its shape.

Support for the shaped block of semi-soft cheese 16 is provided by a cradle 21 which has a semi-cylindrical interior surface 22 of the same dimensions and shape as the interior of the form 7. The cradle 21 is made of an integrally molded member made of a foamed synthetic material such as polystyrene foam, and it is shaped to have rectangular end pieces 23 and 24 and a pair of ribs 25 and 26 with rectangular external shapes evenly spaced between the end pieces 23 and 24. This configuration imparts rigidity and strength to the cradle 21, as well as a rectangular exterior shape with a flat bottom surface to stand on. The cradle 21 is a reusable component of the package of the present invention, and in this embodiment it is specifically programmed for at least six uses before being discarded. Thus the cost of the cradle 21 per package is reduced to a minimum. The crade 21 molded of polystyrene foam is light weight, strong, durable, shock absorbing and a good insulation against ambient heat.

Another component of the package according to the present invention is a carton 27, which serves as an external support and protective shell for the package. The carton 27 is conventionally constructed out of a blank of corrugated paper with end and side flaps (not shown) which are folded and sealed together so that it is completely enclosed except at the top. Four top flaps 28, 29, 30 and 31 are hinged by fold lines to respective side walls 32, 33, 34 and 35 of the carton 27 so that the carton 27 can be closed and opened. The interior dimensions and shape of the carton 27 and the exterior dimensions and shape of the end pieces 23 and 24 and the ribs 25 and 26 of the cradle 21 are such that the cradle 21 will fit snugly in the carton 27, completely filling it.

Still another component of the package according to the present invention is a sheet of flexible wrapping material 36. The wrapping material 36 may be any of the commonly used plastic films or coated papers. The specific wrapper material 36 will be selected on its ability to withstand deterioration from the fats and other constituents of the specific semi-soft cheese 16 to be wrapped, and on its ability to conform tightly to the contours of the cheese 16 and to the interior surface 22 of the cradle 21. The wrapping sheet 36 should be big enough to cover the interior surface 22 of the cradle 21 and to be folded over the top or flat surface 19 of the block of semi-soft cheese 16.

To package semi-soft cheese 16 according to the present invention, the top flaps 28–31 of the carton 27 are folded open, and the cradle 21 is placed inside the carton 27 with its interior surface 22 opening outwardly. The sheet of wrapping material 36 is spread over the interior surface 22 of the cradle 21 so that it is approximately centered on the cradle 21. The cooled shaped block of semi-soft cheese 16 that has been taken from the form 7 is laid on the wrapper 36 in the interior surface 22 of the cradle 21. Overhanging peripheral portions 37 of the wrapper 36 are folded over the exposed, flat side surface 19 of the shaped block of cheese 16 so that it completely covers the exposed flat surface 19. The folded peripheral portions 37 of the wrapper 36 on the flat surface 19 of the shaped block of cheese 16 need not be sealed, but can be allowed to remain loose and unsealed. Thus the folded wrapping sheet 36 may be referred to as an open wrapper 38 to distinguish it from the heat sealed bags used previously, though both wrappers cover the entire surface of the shaped block of cheese 16.

After the open wrapper 38 is formed, the top flaps 28–31 of the carton 27 can be folded over in the conventional manner to form a closed carton 39. The closed package 39 may have the top flaps 28–31 of the carton 27 sealed with an adhesive, or a top, or any other means, or the flaps 28–31 may be left unsealed.

The natural tendency of semi-soft cheese to plastic deformation under its own weight, which had previously been a problem, is utilized by the present invention to achieve an improved package with increased shelf life. Under the force of its own weight the block of semi-soft cheese 16 inside the wrapper 38 in the carton 27 will flow to fill the entire interior surface 22 of the cradle 21, and in so doing it squeezes out all of the air between the portion of the wrapper 38 and the block of semi-soft cheese 16 that rests against the inside surface 22 of the cradle 21. Thus the end surfaces 17 and 18 and the curved surface 20 of the shaped block of cheese 16 becomes sealed against air by atmospheric pressure, the weight of the cheese 16 and the surface-to-surface adhesion created by those forces and the surface characteristics of and between the block of cheese 16 and the wrapping material 36. Without air the cheese mold, which is the primary limiting factor to shelf life, cannot grow.

Only the flat top surface 19 of the block of cheese 16 remains to be sealed, and this is achieved by stacking the closed packages 39 of the cheese in the manner shown in the drawing so that the weight of the top packages 39 tends to seal the overlapping folded peripheral portions 37 of the wrapping material 36 together against the flat surface 19 of the shaped block of cheese 16. The weight of the stacked packages 39 tends to drive out the air and to form a seal between the wrapper 38 and the block of cheese 16. As the closed packages 39 are moved from the storage room to the truck, or railroad car, and to the customer's storage room, the locations of packages 39 are shifted through the stack so that each package 39 is, in the course of its shelf life, subjected to the weight of a greater or lesser portion of the stack, and thereby sealed.

It is not to be expected that the average shelf life obtainable by an open wrapper 38 will equal the best shelf life obtainable with a perfectly sealed vacuum wrapped package of cheese. However, a shaped block of cheese 16 packaged according to the invention in an open wrapper 38 will have substantially greater shelf life than the same kind of cheese in an open wrapper packaged in any other way known. The reusability of the cradle 21 and the carton 27 renders the per package cost almost negligible. Since the cost of a flat sheet of wrapping material 36 is but a very small fraction of the cost of a manufactured bag of wrapping material the cost of the overall package is very substantially less than had previously been possible.

As mentioned, the preferred embodiment of the invention disclosed here is the packaging of mozzarella cheese for use in the manufacture of pizza for distribution as a frozen food product. This specific end use has determined the specific type of semi-soft cheese 16, the shape and size of the semi-soft cheese 16, and, thus, the shape and size of the form 7 and all of the components making up the completed package 39 disclosed here. Other end uses will call for different semi-soft cheeses in different shapes and different sizes with corresponding differences in the packaging components and ultimate package 39. More than one cradle 21 could be packed in one carton 27, or both the shapes and sizes of the cradle 21 and carton 27 could be varied to suit a preference. Whatever its form, a package according to the present invention will provide more food to the consumer at a lower cost by maximizing utilization of the packaging materials, minimizing the labor requirements of packaging, minimizing reshaping of the cheese product to suit the desired end use, allowing more automation, extending shelf life and providing better protection against physical damage to the cheese product during shipping, handling and storaging. Accordingly, the invention is not limited to the best mode presently contemplated by the inventor for practicing the invention, which has been detailed here, but instead the subject matter of the invention is particularly pointed out in the claims that follow.

I claim:

1. A cheese package for packaging semi-soft cheese that will not retain its shape without external support comprising the combination of
    a carton forming an external supporting and protective shell;
    a reusable cradle externally shaped and dimensioned to fit snugly in said carton, having sufficient rigidity and strength to be self-supporting and to support a quantity of semi-soft cheese, and having a hollow interior conforming in shape and size to dimensions and configurations of said quantity of semi-soft cheese to be packaged;
    and a flat sheet of wrapping material lining said hollow interior of said cradle and adapted to enclose a cheese to be packaged.

2. A cheese carton as set forth in claim 1 wherein said carton has hinged top flaps for opening and closing it; and said cradle fills said carton and opens upwardly.

3. A cheese carton as set forth in claim 2 wherein said carton is a paper carton; and said cradle is an integrally molded synthetic foam.

4. A cheese package as set forth in claim 3 wherein said shape of said hollow interior of said cradle is semi-cylindrical, and said cradle has exterior ribs and end pieces with rectangular external configurations.

5. A process for packaging semi-soft cheese comprising the steps of
    heating cheese to an amorphous doughy consistency;
    pressing said doughy cheese into a hollow form having an interior conforming to a desired shape;
    cooling said cheese to its final semi-soft condition;
    removing said semi-soft cheese from said form;
    placing said cheese in a reusable rigid self-supporting cradle having an interior shape substantially identical to said desired shape and being lined with a flexible wrapping material with an overhanging peripheral portion;
    folding said overhanging peripheral portion of said wrapping material over said cheese to enclose said cheese;
    and placing said cradle containing said semi-soft cheese in an outer protective carton.

References Cited

UNITED STATES PATENTS

| | | | |
|---|---|---|---|
| 2,777,770 | 1/1957 | Fisher | 99—178 |
| 2,982,661 | 5/1961 | Thompson | 99—178 |
| 3,060,035 | 10/1962 | Berst | 99—178 |
| 3,143,430 | 8/1964 | Snow | 99—178 |
| 3,182,890 | 5/1965 | Elam | 99—178 |

OTHER REFERENCES

Styrene Foam in Germany, "Modern Plastics," April 1960, pp. 100, 101, 176.

TIM R. MILES, Primary Examiner